Patented Sept. 22, 1942

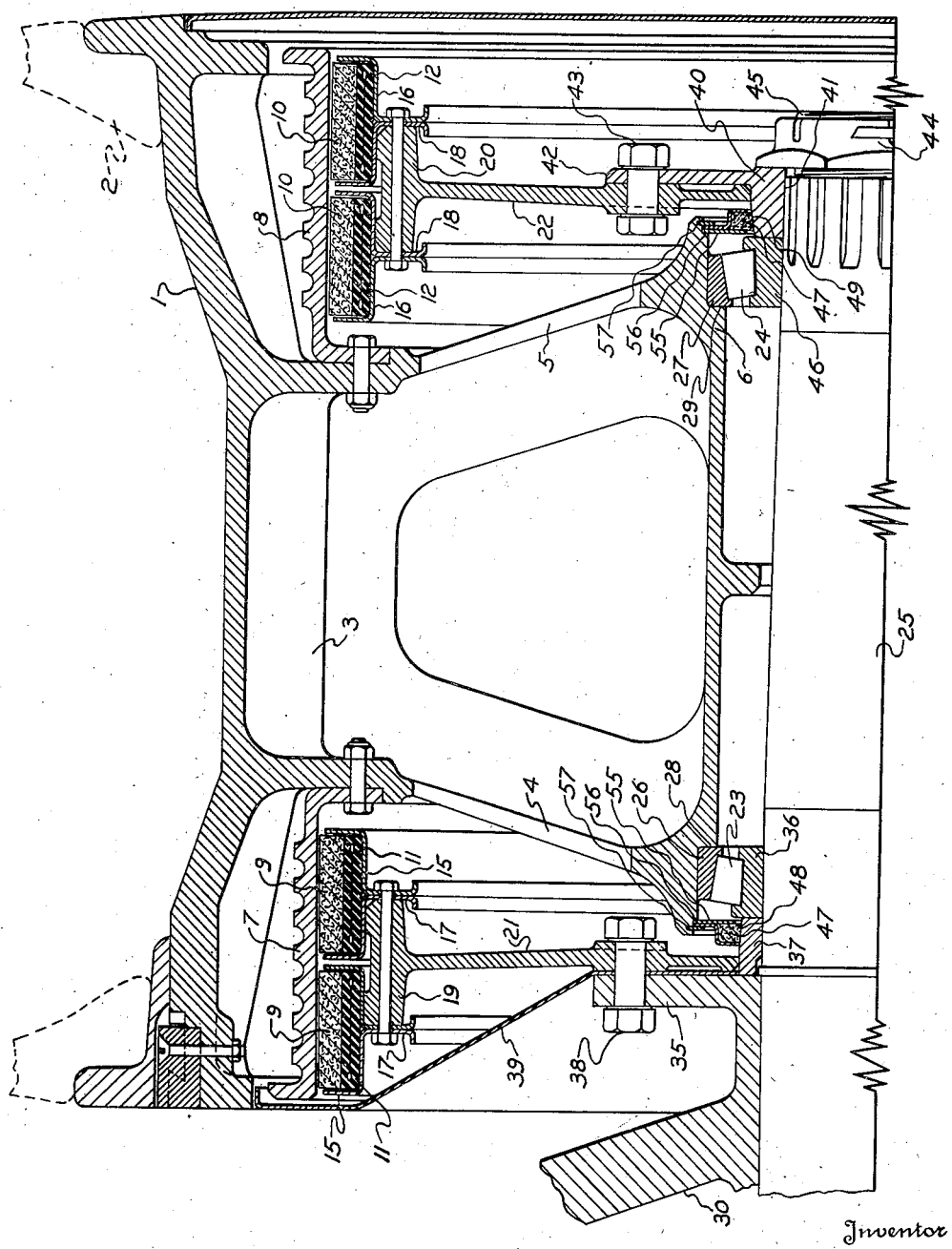

2,296,671

UNITED STATES PATENT OFFICE 2,296,671

WHEEL BRAKE STRUCTURE

Charles Hollerith, Jackson, Mich., assignor to Hayes Industries, Inc., Jackson, Mich., a corporation of Michigan Application March 18, 1940, Serial No. 324,527

1 Claim. (Cl. 188—18)

The present invention relates to brake structure for wheels and more particularly to a brake structure adapted for use on aircraft landing wheels.

In general, the present invention is concerned with an improved arrangement for the support of the brake assembly, having particular reference to brake and wheel combination in which a brake is located upon the outer side of the wheel and mounted upon a cantilever axle.

Thus, one of the objects of the present invention is to provide an improved arrangement for supporting a brake assembly which is readily removable as a unit.

Another object of the invention is to provide an improved arrangement for supporting a brake assembly located upon the outer side of the wheel, through the wheel axle.

A still further object of the invention is to provide a ring-shaped web for supporting a brake assembly and a sleeve having supported with respect thereto a radial flange, the radial flange having connections for supporting the web against axial movement and the sleeve supporting the web radially, together with means for clamping the sleeve and thus the brake assembly in assembled relation with respect to the wheel and axle.

A still further object of the invention is to accurately center a brake structure with respect to its drum.

These and other objects relating to the construction, arrangement and combination of the parts will be apparent from the following specification when taken with the accompanying drawing in which the figures disclose one-half of a vertical section of an airplane wheel together with its axle and axle support, illustrating the invention.

Referring particularly to the drawing, the reference character 1 indicates a wheel having supported thereon a pneumatic tire 2. The wheel 1 is provided with reinforcing ribs 3, 4 and 5 which are spaced circumferentially about the wheel in a known manner. The wheel is also provided with a hub 6 and brake drums 7 and 8. The brake drums 7 and 8 have in operative relation therewith pairs of brake blocks 9 and 10 which are urgable against the drums 7 and 8 by pairs of hydraulic tubes 11 and 12 respectively. The brake blocks 9 and 10 and hydraulic tubes 11 and 12 are supported respectively in pairs of channels 15 and 16, having flanges 17 and 18 respectively. The pairs of flanges 17 and 18, which it will be understood are annular in form, are connected to rings 19 and 20, which are in turn supported by ring-shaped webs 21 and 22.

The wheel 1 is supported on bearings 23 and 24 from an axle 25. Outer races 26 and 27 of the bearings 23 and 24 are maintained against inward movement with respect to the wheel 1 by shoulders 28 and 29 in the hub 6 of the wheel 1. The axle 25 is supported in the landing gear member 30 in some conventional manner and against rotation.

The foregoing structure broadly as such does not comprise any part of the present invention, the present invention relating to the structure for supporting the ring-shaped brake members 21 and 22 with respect to their axle 25 and the landing gear member 30.

The outer end of the landing gear member 30 is provided with a radially extending annular flange 35. Disposed on the axle 25 and between the landing gear member 30 and the inner race 36 of the bearing 23 is sleeve 37. As shown particularly in the drawing, the sleeve 37 is in circumferential contact with the brake member 21 which is concentrically disposed thereabout, the sleeve 37 thus serving as a radial support for the brake member 21. A series of circumferentially spaced bolts 38, only one of which is shown, serves to hold the brake member 21 to the flange 35. Between the brake member 21 and the flange 35 is clamped a ring-shaped fairing 39.

At the opposite end of the wheel 1 is provided a sleeve 40 splined to the shaft 25 as at 41. The sleeve 40 has an integral, radially extending flange 42 to which is clamped, by means of a plurality of circumferentially spaced bolts 43, the brake member 22. As shown in the drawing, the sleeve 40 circumferentially contacts with the brake member 22 in the same manner as the sleeve 37 circumferentially contacts with the brake member 21. A nut 44 is threaded onto the projecting end 45 of the axle 25 and serves to clamp not only the sleeve 40 against the inner race 46 of the bearing 24 but also serves to urge the entire wheel 1 to the left as shown in the drawing to move the inner race 36 of the bearing 23 to clamp the sleeve 37 against the landing gear member 30. In this way the wheel 1 is secured to the axle 25 and the brake assemblies, supported by the brake members 21 and 22, are supported in assembled relation to the wheel 1.

At each end of the hub 6 is a grease seal 47, bearing against the sleeves 37 and 40 respectively. It will be observed that the sleeves 37 and 40 are provided with inwardly inclined outer surfaces 48 and 49 respectively against which each grease seal 47 bears. Thus is assembling the entire wheel and brake structures on the axle 25, as one seal 47 adjacent the sleeve 37 moves thereover, a tight contact is obtained, and as the sleeve 40 moves within the other seal 47, a tight contact is obtained. The seals 47 each are provided with an annular flange 55 which is held against a shoulder 56 by a spring ring 57.

It will be apparent from the foregoing description that the entire brake assemblies may be readily disassociated from the wheel 1 and worked upon for either servicing or repairing. Furthermore, by reason of using the sleeves 37 and 40 the ring-shaped brake members 21 and 22 may be accurately mounted with respect to the drums 7 and 9 and also radially supported irrespectively of the action of the bolts 38 and 43 respectively.

Having thus described my invention, what I desire to secure by Letters Patent and claim is:

In combination with a wheel, an axle therefor and a support for maintaining said axle against rotation, bearings adjacent the ends of said wheel for supporting said wheel on said axle for rotation thereabout, a sleeve on said axle between said wheel and said axle support, a radial flange on said axle support, a ring-shaped brake member concentrically disposed about said sleeve, said sleeve being in circumferential engagement with said brake member, a supporting connection between said flange and said brake member, a second sleeve on the opposite end of said wheel splined to said axle, a second radially extending flange on said second sleeve, a second ring-shaped brake member concentrically disposed about said second sleeve, said second ring-shaped brake member being secured to said second radially extending flange, said second sleeve being in circumferential engagement with said second brake member, said bearing structures having inner and outer races, said wheel having shoulders for receiving said outer races for limiting inner movement of said outer races with respect to said wheel, one of said sleeves being in end contact with one of said inner races and the other of said sleeves being in end contact with the other of said inner races, means supported with respect to said axle for clamping said second sleeve against its engaging inner race and for axially moving said wheel to cause said other inner race to clamp said first named sleeve against said axle support whereby said sleeves and brake members are maintained in fixed relation with respect to said axle and axle support while at the same time permitting rotation of said wheel.

CHARLES HOLLERITH.